United States Patent
Tibuleac et al.

(10) Patent No.: US 11,489,597 B2
(45) Date of Patent: Nov. 1, 2022

(54) METHOD AND NETWORK CONTROL DEVICE FOR OPTIMIZING PERFORMANCE OF A MULTI-SPAN OPTICAL FIBER NETWORK

(71) Applicant: ADVA Optical Networking SE, Meiningen (DE)

(72) Inventors: Sorin Tibuleac, Johns Creek, GA (US); Steven Searcy, Atlanta, GA (US); Sergey Burtsev, Duluth, GA (US)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 17/063,224

(22) Filed: Oct. 5, 2020

(65) Prior Publication Data
US 2022/0109509 A1    Apr. 7, 2022

(51) Int. Cl.
| | |
|---|---|
| *H04B 10/00* | (2013.01) |
| *H04B 10/69* | (2013.01) |
| *H04B 17/336* | (2015.01) |
| *H04B 10/077* | (2013.01) |
| *H04B 10/293* | (2013.01) |
| *H04B 10/297* | (2013.01) |
| *H04B 10/291* | (2013.01) |

(52) U.S. Cl.
CPC ....... *H04B 10/697* (2013.01); *H04B 10/0777* (2013.01); *H04B 10/2935* (2013.01); *H04B 10/2972* (2013.01); *H04B 17/336* (2015.01); *H04B 10/2916* (2013.01)

(58) Field of Classification Search
CPC combination set(s) only.
See application file for complete search history.

(56) References Cited

U.S. PATENT DOCUMENTS

| | | |
|---|---|---|
| 6,288,836 B1 | 9/2001 | Kawasaki et al. |
| 2015/0304035 A1* | 10/2015 | Nijhof ................. H04J 14/0221 398/26 |
| 2018/0343078 A1 | 11/2018 | Roberts et al. |

FOREIGN PATENT DOCUMENTS

| | | |
|---|---|---|
| EP | 2992627 B1 | 7/2017 |
| WO | 2014019631 A1 | 2/2014 |

\* cited by examiner

*Primary Examiner* — Agustin Bello
(74) *Attorney, Agent, or Firm* — The Webb Law Firm

(57) ABSTRACT

The present invention relates to a method for optimizing performance of a multi-span optical fiber network. Each span has an associated optical transmission fiber connected to an associated optical amplifier. Gain and output power of the associated optical amplifier are respectively controlled independently. An amplifier noise figure respectively depends on the gain of the associated optical amplifier, with each associated optical amplifier further connected to launch optical signals into a remainder of a corresponding optical transmission line. The method includes the steps of for each span, computing the amplifier noise figure and a non-linear noise generated in the span based on information about the span and using the computed amplifier noise figure and the computed non-linear noise to compute an optimum launch power, and optimizing performance of the multi-span optical fiber network based on the computed optimum launch powers of all spans.

17 Claims, 3 Drawing Sheets

METHOD AND NETWORK CONTROL DEVICE FOR OPTIMIZING PERFORMANCE OF A MULTI-SPAN OPTICAL FIBER NETWORK

BACKGROUND OF THE INVENTION

Field of the Invention

The present application relates to optical communication systems and, in particular, to a method for optimizing performance of a multi-span optical fiber network that takes into account non-linear effects.

Description of Related Art

In an optical fiber transmission line of an optical communication system, an amplifier couples sequentially related optical transmission fiber spans. The amplifiers produce adequate optical launch powers to compensate for power losses to optical signals in the immediately preceding fiber span and other elements.

Further, network operators have a strong interest in making most efficient use of their investments in the network infrastructure, and therefore, a strong interest in achieving the highest transmission capacity through the fiber optical transmission lines in the network. Therein, for most fiber optical transmission lines impairments determining the total capacity of the fiber within a given bandwidth are amplified spontaneous emission (ASE) noise from optical amplifiers along the line and fiber nonlinear effects. It is also known that the power of the optical signal launched into each span is a critical parameter of the system, which determines the capacity that can be attained. Low power launched into the fiber yields a low optical signal-to-noise ratio (OSNR), which reduces the available transmission rate. High power launched into the fiber produces nonlinear distortions. Thus, low launch power increases the amplified spontaneous emission noise, while high launch power increases nonlinear noise, and an optimum launch power into each fiber exists where the performance of a signal is maximized.

Therefore, the optimization of the launch power is important to optimize the performance of the network. However, known methods to determine the optimum launch power are based on a simplified optimization approach, wherein the noise figure of the optical amplifiers is assumed to be constant regardless of the amplifier gain value used to compensate the span loss, regardless of the tilt setting the amplifier, and assumed to be constant for all channels. However, this over-simplification leads to an error in the estimation of the optimum launch power, in particular as there are optical amplifiers known with independent gain and output power controls. Therefore, there is a need for a method for optimizing performance of a multi-span optical fiber network, wherein the determination of the optimum launch power is as precise as possible.

US 2018/0343078 A1 discloses a power control in an optical fiber network, wherein multiple receivers are comprised in a flexible coherent transceiver of a multi-span optical fiber network, and wherein each of the multiple receivers is operative to handle communications on a respective channel. The multiple receivers measure optical characteristics. For each of the multiple receivers, the optical characteristics include optical nonlinear interactions on the respective channel, the optical nonlinear interactions being at least partially dependent from one span to another span. An optical power of a signal on each of the multiple channels is adjusted as a function of the optical characteristics.

SUMMARY OF THE INVENTION

According to one embodiment of the present invention, a method for optimizing performance of a multi-span optical fiber network is provided, wherein each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line. Therein, for each span, the amplifier noise figure and a non-linear noise generated in each span are computed based on information about the span, wherein the computed amplifier noise figure and the computed non-linear noise are used to compute an optimum launch power. Thereafter, the performance of the multi-span optical fiber network is optimized based on the computed optimum launch powers of all spans.

Therein, that gain and output power of the associated optical amplifier are respectively controlled independently, wherein an amplifier noise figure respectively depends on the gain of the associated optical amplifier, means that the associated optical amplifier is an optical associated amplifier with independent gain and output power controls and amplifier noise figure dependence on amplifier gain. Therein, for example the control of the output power can be integrated in the optical amplifier but can also be established independently of the optical amplifier. Further, that the parameters and, in particular, that the amplifier noise figure and a non-linear noise generated in each span are computed means that these parameters, respectively information characterizing the parameters are derived respectively calculated by methods of functional analysis and numerical mathematics.

Thus, a method for optimizing performance of a multi-span optical fiber network is provided, wherein the determination of the optimum launch power into a fiber span is as precise as possible, as all relevant parameters that can impact the value of the optimum launch power are taken into account. In particular, the amplifier noise figure is not assumed to be constant but for each span information characterizing the noise figure is defined. Therein, the information about the span preferably includes all relevant parameters of the fiber and information about components which can impact the value of the optimum launch power. Further, as the optimum launch power is separately computed for each span, a global transmission fiber line optimization problem can be reduced to a local per span optimization problem, which makes the optimization numerically very fast, while supporting multi-span transmission fiber lines with different types of fiber in different spans. Therefore, the method also addresses the problem that communication systems often evolve and grow during their lifetime, wherein, due to their evolution and growth, these infrastructures often combine different technologies which can produce optical fiber transmission lines that are span-wise heterogeneous and, for example, have different fiber span lengths, different fiber types etc.

The multi-span optical fiber network is preferably a wavelength-division multiplexing (WDM) network, wherein the optimization can be used for any wavelength division multiplexing network, irrespective of the network topology, for example point-to-point, ring, or meshed networks, with any combination of network nodes which use amplifiers with gain and output power control including terminal sites, fixed optical add-drop, reconfigurable optical add-drop multiplexer, or amplifier nodes.

The information about the span can include a span length, information about the associated transmission fiber, information about an optical amplifier associated with a previous span, a symbol rate of a corresponding transceiver, and frequency spacing between channels transmitted on said previous span. In particular, the information about the span can include a span length, the noise figure of an amplifier as well as information about fiber losses and nonlinear properties of the span, and therefore, all relevant parameters of the fiber and information about components which can impact the value of the optimum launch power. Further, the information about the optical amplifier associated with the previous span can include gain and/or output power of the optical amplifier associated with the previous span. Thus, all information is taken into account that can impact the optimum launch power, wherefore the optimum launch power can be computed as precisely as possible. However, that the information about the span includes a span length, information about the associated transmission fiber, information about the optical amplifier associated with the previous span, a symbol rate of a corresponding transceiver and frequency spacing between channels transmitted on said previous span should merely be understood as an example, and in some embodiments the information about the span can for example also include information about the optical amplifier tilt.

In one embodiment, optimizing performance of the multi-span optical fiber network based on the computed optimum launch powers of all spans comprises separately optimizing performance of each span by setting the gain of an amplifier associated with a particular span and the output power of an amplifier associated with a span that is immediately preceding the particular span based on the computed optimum launch power of the particular span. Thus, the performance of each span can be optimized separately in a simple manner, whereby also the performance of the whole multi-span optical fiber network is optimized. In particular, by setting the output power of an amplifier associated with a span immediately preceding the particular span based on the computed optimum launch power of the particular span, it can be ensured that this optimum launch power is in fact launched into the particular span. Further, power losses in the particular span at the optimum launch power can be compensated by setting the gain of the amplifier associated with the particular span based on the computed optimum launch power. Therein, the gain of the associated amplifier can further be set based on an optimum gain that is derived from the computed optimum launch power. However, that the performance of the multi-span optical fiber network is optimized by separately optimizing performance of each span by setting the gain of an amplifier associated with a particular span and the output power of an amplifier associated with a span that is immediately preceding the particular span based on the computed optimum launch power of the particular span should merely be understood as an example, and the performance of the multi-span optical fiber network can be optimized in a different way, too. For example, the performance of the multi-span optical fiber network may also be optimized by adjusting one or more of the parameters of flexible coherent transceivers, wherein each of the flexible coherent transceivers can be operative to handle communications on a respective channel, and wherein the parameters can include a symbol rate, a modulation format, channel spacing, signal spectral shape, or FEC type.

Further, for each span, the computed optimum launch power can be used to calculate a maximum generalized optical signal-to-noise ratio of the span. Further, the calculated maximum generalized optical signal-to-noise ratios of all spans can then be used to optimize the performance of the multi-span optical fiber network. The maximization of the generalized optical signal-to-noise ratio results in the optimization of signal primary measurable characteristics, for example the maximization of the signal-to-noise ratio and the signal parameter Q, as well as the minimization of the bit-error-rate.

Also linear equivalents of the information about the span can be used to compute the amplifier noise figure. Thereby, the computational effort required to compute the optimum launch power can be further reduced, as non-linear terms and equations can be transformed into linear equations.

In one embodiment, the performance of the multi-span optical fiber network is optimized during a planning phase of a network deployment, wherein usual values are chosen for the information about the span. Therein, the planning phase is a phase during the network planning and design, in which it is, among others, determined whether a predefined system infrastructure, sites, and an operational environment can support a proposed system. Thus, the method is applicable in the network planning process, wherein a network operator is provided with an assessment of the capacity that can be achieved on a given fiber transmission line with a given set of transmission equipment, for example a given set of wavelength-division multiplexing transmission equipment such as transceivers, amplifiers, reconfigurable optical add/drop multiplexers and other wavelength-division multiplexing system components. Therefore, the network operator can deploy the network components already during the network planning phase in such a way that the highest transmission capacity through fiber transmission lines in the network is achieved. That usual values are chosen for the information about the span means that the values are chosen in such a way that they are common for a comparable usual span, respectively that either design or manufacturing data is chosen for the values. For example, a dependence between noise figure and gain can be chosen that represents a usual amplifier, or a worst-case amplifier of the same type. Further, the values characterizing the network fiber infrastructure may be provided by a system vendor to a carrier during design stage for the purposes of launch power optimization by the carrier.

Therein, in the multi-span optical fiber network pairs of nodes of the network can be associated with distinct bands of optical channels used for communication between the pairs of nodes, wherein the maximum generalized optical signal-to-noise ratio can be calculated for the central channel based on the computed optimum launch powers of all spans of the central channel, and wherein the maximum generalized optical signal-to-noise ratio of the central channel can be used to optimize the performance of the multi-span optical fiber network. That the maximum generalized optical signal-to-noise ratio is calculated only for the central channel, wherein the maximum generalized optical signal-to-noise ratio of the central channel is used to optimize the multi-span optical fiber network has the advantage that the computational effort required to optimize the multi-span optical fiber network can be further reduced. Therein, the central channel is assumed for simplicity and numerical speed-up, to be the worst one in performance due to larger nonlinear noise accumulation, compared with other channels.

In a further embodiment, the performance of the multi-span optical fiber network is optimized as part of a network turn-up and commissioning, wherein exact values are chosen for the information about the span. Therein, network turn-up and commissioning means the phase after the system equipment has been deployed, during which a series of steps are taken to prove that the system actually meets the specific requirements. Thus, the method is also applicable to optimize the multi-span optical fiber network during line turn-up/commissioning, and therefore, after the system equipment has been deployed and turned up in the field. Therein, the fact that exact values, or more accurate values, that can be provided by a system management software are chosen for the information about the span has the advantage that the effectiveness of the method can be further improved. In particular, during line turn-up/commissioning, the system management software can provide more accurate data for span lengths and span losses for re-evaluation of the system performance. Similarly, a corresponding field-based characterization of the noise figure of the amplifier can be chosen. Alternatively, the amplifier noise figure can be measured during the manufacturing process, and stored in a memory, for example a nonvolatile memory within the amplifier module.

Therein, in the multi-span optical fiber network pairs of nodes of the network can be associated with distinct bands of optical channels used for communication between the pairs of nodes, wherein a maximum generalized optical signal-to-noise ratio can be calculated for each channel separately based on the computed optimum launch powers of all spans of the respective channel, wherein a worst generalized optical signal-to-noise ratio is determined from the calculated maximum generalized optical signal-to-noise ratios, and wherein the worst generalized optical signal-to-noise ratio is used to optimize the performance of the multi-span optical fiber network. Thus, the effectiveness of the method can be further improved by removing the assumption that the central channel is the worst performing channel, which may not be the worst performing channel in the field, wherein at the same time the computational effort required to optimize the performance of the multi-span optical fiber network can be further reduced.

According to another embodiment of the invention, a network control device for optimizing performance of a multi-span optical fiber network is provided, wherein each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line. Therein, the network control device comprises a computing means which is configured to, for each span, compute the amplifier noise figure and a non-linear noise generated in the span based on information about the span, and to use the computed amplifier noise figure and the computed non-linear noise to compute an optimum launch power, and an optimizing means which is configured to optimize performance of the multi-span optical fiber network based on the computed optimum launch powers of all spans.

Therein, that gain and output power of the associated optical amplifier are respectively controlled independently, wherein an amplifier noise figure respectively depends on the gain of the associated optical amplifier, means that the associated optical amplifier is an optical amplifier with independent gain and output power controls and amplifier noise figure dependence on amplifier gain. Therein, for example the control of the output power can be integrated in the optical amplifier but can also be established independently of the optical amplifier. Further, that the parameters and, in particular, that the amplifier noise figure and a non-linear noise generated in each span are computed means that these parameters, respectively information characterizing the parameters are derived respectively calculated by methods of functional analysis and numerical mathematics.

Thus, a network control device for optimizing performance of a multi-span optical fiber network is provided which is as precise as possible, as all relevant parameters that can impact the value of the optimum launch power are taken into account. In particular, the amplifier noise figure is not assumed to be constant but for each span information characterizing the noise figure is defined. Therein, the information about the span preferably includes all relevant parameters of the fiber and information about components which can impact the value of the optimum launch power. Further, as the optimum launch power is separately computed for each span, a global transmission fiber line optimization problem can be reduced to a local per span optimization problem, which makes the optimization numerically very fast, while supporting multi-span transmission fiber lines with different types of fiber in different spans. Therefore, the network control device also addresses the problem that communication systems often evolve and grow during their lifetime, wherein, due to their evolution and growth, these infrastructures often combine different technologies which can produce optical fiber transmission lines that are span-wise heterogeneous.

The multi-span optical fiber network is preferably a wavelength-division multiplexing (WDM) network, wherein the optimization can be used for any wavelength-division multiplexing network, irrespective of the network topology, for example point-to-point, ring, or meshed networks, with any combination of network nodes which use amplifiers with gain and output power control including terminal sites, fixed optical add-drop, reconfigurable optical add-drop multiplexer, or amplifier nodes.

The information about the span can include a span length, information about the associated transmission fiber, information about an optical amplifier associated with a previous span, a symbol rate of a corresponding transceiver and a frequency spacing between channels transmitted on the previous span. In particular, the information about the span can include a span length, the noise figure of an amplifier as well as information about fiber losses and nonlinear properties of the span, and therefore, all relevant parameters of the fiber and information about components which can impact the value of the optimum launch power. Further, the information about the optical amplifier associated with the previous span can include gain and output power of the optical amplifier associated with the previous span. Thus, all information is taken into account that can impact the optimum launch power, wherefore the optimum launch power can be computed as precisely as possible. However, that the information about the span includes a span length, information about the associated transmission fiber, information about the optical amplifier associated with the previous span, a symbol rate of a corresponding transceiver and a frequency spacing between channels transmitted on the previous span should merely be understood as an example, and in some embodiments the information about the span can for example also include information about the optical amplifier tilt.

In one embodiment, the optimizing means comprises a controlling means that is configured to separately optimize the performance of each span by setting the gain of an amplifier associated with a particular span and the output power of an amplifier associated with a span that is immediately preceding the particular span based on the computed optimum launch power of the particular span. Thus, the performance of each span can be optimized separately in a simple manner, whereby also the performance of the whole multi-span optical fiber network is optimized. In particular, by setting the output power of an amplifier associated with a span immediately preceding the particular span based on the computed optimum launch power of the particular span, it can be ensured that this optimum launch power is in fact launched into the particular span. Further, power losses in the particular span at the optimum launch power can be compensated by setting the gain of the amplifier associated with the particular span based on the computed optimum launch power. Therein, the gain of the associated amplifier can in particular be set based on an optimum gain that is derived from the computed optimum launch power. However, that the network control device is configured to optimize the performance of the multi-span optical fiber network by separately optimizing performance of each span by setting the gain of an amplifier associated with a particular span and the output power of an amplifier associated with a span that is immediately preceding the particular span based on the computed optimum launch power of the particular span should merely be understood as an example, and the network control device can be configured to optimize performance of the multi-span optical fiber network in a different way, too. For example, the optimizing means may also be configured to optimize performance of the multi-span optical fiber network by adjusting one or more of the parameters of flexible coherent transceivers, wherein each of the flexible coherent transceivers can be operative to handle communications on a respective channel, and wherein the parameters can include a symbol rate, a modulation format, channel spacing, signal spectral shape, or FEC type.

Further, the optimizing means can include a calculation means that is configured to, for each span, use the computed optimum launch power to calculate a maximum generalized optical signal-to-noise ratio. Further, the optimizing means can be configured to then use the calculated maximum generalized optical signal-to-noise ratios of all spans to optimize the performance of the multi-span optical fiber network. The maximization of the generalized optical signal-to-noise ratio results in the optimization of signal primary measurable characteristics, for example the maximization of the signal-to-noise ratio and the signal parameter Q, as well as the minimization of the bit-error-rate.

Also the computing means can be configured to use linear equivalents of the information about the span to compute the amplifier noise figure. Thereby, the computational effort required to compute the optimum launch power can be further reduced, as non-linear terms and equations can be transformed into linear equations.

In one embodiment, the network control device is configured to optimize the performance of the multi-span optical fiber during a planning phase of a network deployment, and therefore, the phase during which it is determined how to best implement the network, wherein usual values are chosen for the information about the span which are stored in a memory. Therein, the planning phase is a phase during the network planning and design, in which it is, among others, determined whether a predefined system infrastructure, sites, and an operational environment can support a proposed system. Thus, the network control device can be used in the network planning process, wherein a network operator is provided with an assessment of the capacity that can be achieved on a given fiber transmission line with a given set of transmission equipment, for example a given set of wavelength-division multiplexing transmission equipment such as transceivers, amplifiers, reconfigurable optical add/drop multiplexers and other wavelength-division multiplexing system components. Therefore, the network operator can deploy the network components already during the network planning phase in such a way that the highest transmission capacity through fiber transmission lines in the network is achieved. That usual values are chosen for the information about the span means that the values are chosen in such a way that they are common for a comparable usual span, respectively that either design or manufacturing data is chosen for the values. For example, a dependence between noise figure and gain can be chosen that represents a usual amplifier of the same type. Further, the values may be provided by a system vendor to a carrier during design stage for the purpose of launch-power optimization by the carrier Therein, in the multi-span optical fiber network pairs of nodes of the network can be associated with distinct bands of optical channels used for communication between the pairs of nodes, wherein the network control device can be configured to calculate the maximum generalized optical signal-to-noise ratio for the central channel based on the computed optimum launch powers of all spans of the central channel and to use the maximum generalized optical signal-to-noise ratio of the central channel to optimize the performance of the multi-span optical fiber network. That the maximum generalized optical signal-to-noise ratio is calculated only for the central channel, wherein the maximum generalized optical signal-to-noise ratio of the central channel is used to optimize the performance of the multi-span optical fiber network has the advantage that the computational effort required to optimize the performance of the multi-span optical fiber network can be further reduced. Therein, the central channel is assumed for simplicity and numerical speed-up, to be the worst one in performance due to larger nonlinear noise accumulation, compared with other channels.

In a further embodiment, the network control device is configured in such a way that the performance of the multi-span optical fiber network is optimized as part of a network turn-up and commissioning, wherein exact values are chosen for the information about the span, and wherein the network control device further comprises a first determining means which is configured to determine exact values for the information about the span. Therein, network turn-up and commissioning means the phase after the system equipment has been deployed, during which a series of steps are taken to prove that the system actually meets the specific requirements. Thus, the network control device can also be used to optimize the multi-span optical fiber network during line turn-up/commissioning, and therefore, after the system equipment has been deployed and turned up in the field. Therein, the fact that exact values, or more accurate values, that can be provided by a system management software are chosen for the information about the span has the advantage that the effectiveness of the method can be further improved. In particular, during line turn-up/commissioning, the system management software can provide more accurate data for span lengths and span losses for re-evaluation of the system performance. Similarly, a corresponding field-based characterization of the noise figure of the amplifier can be chosen. Alternatively, the amplifier noise figure can be measured during the manufacturing process, and stored in a memory, for example a nonvolatile memory within the amplifier module.

Therein, in the multi-span optical fiber network pairs of nodes of the network can be associated with distinct bands of optical channels used for communication between the pairs of nodes, wherein the calculation means can be configured to separately calculate a maximum generalized optical signal-to-noise ratio for each channel based on the computed optimum launch powers of all spans of the respective channel, wherein the network interface device further comprises a second determining means which is configured to determine a worst generalized optical signal-to-noise ratio from the calculated maximum generalized optical signal-to-noise ratios, and wherein the optimizing means is configured to use the worst generalized optical signal-to-noise ratio to optimize the performance of the multi-span optical fiber network. Thus, the effectiveness of optimizing the performance of the multi-span optical fiber network can be further improved by removing the assumption that the central channel is the worst performing channel, which may not be the worst performing channel in the field, wherein at the same time the computational effort required to optimize the multi-span optical fiber network can be further reduced.

Further provided is a system, which comprises a multi-span optical fiber network and a network control device for optimizing performance of a multi-span optical fiber network as described above.

According to a further embodiment of the invention, a program product is provided comprising a computer-readable storage medium that stores code executable by a processor. Therein, the executable code comprises code to:
  for each span in a multi-span optical fiber network, wherein each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line, to compute the amplifier noise figure and a non-linear noise generated in the span based on information about the span, and to use the computed amplifier noise figure and the computed non-linear noise to compute an optimum launch power; and
  to optimize performance of the multi-span optical fiber network based on the computed optimum launch powers of all spans.

Therein, that gain and output power of the associated optical amplifier are respectively controlled independently, wherein an amplifier noise figure respectively depends on the gain of the associated optical amplifier, means that the associated optical amplifier is an optical amplifier with independent gain and output power controls and amplifier noise figure dependence on amplifier gain. Therein, for example the control of the output power can be integrated in the optical amplifier but can also be established independently of the optical amplifier. Further, that the parameters and, in particular, that the amplifier noise figure and a non-linear noise generated in each span are computed means that these parameters, respectively information characterizing the parameters are derived respectively calculated by methods of functional analysis and numerical mathematics.

Thus, a program product for optimizing a multi-span optical fiber network is provided which is as precise as possible, as all relevant parameters that can impact the value of the optimum launch power are taken into account. In particular, the amplifier noise figure is not assumed to be constant but for each span information characterizing the noise figure is defined. Therein, the information about the span preferably includes all relevant parameters of the fiber and information about components which can impact the value of the optimum launch power. Further, as the optimum launch power is separately computed for each span, a global transmission fiber line optimization problem can be reduced to a local per span optimization problem, which makes the optimization numerically very fast, while supporting multi-span transmission fiber lines with different types of fiber in different spans. Therefore, also the problem that communication systems often evolve and grow during their lifetime, wherein, due to their evolution and growth, these infrastructures often combine different technologies which can produce optical fiber transmission lines that are span-wise heterogeneous, is addressed.

The multi-span optical fiber network is preferably a wavelength-division multiplexing (WDM) network, wherein the optimization can be used for any wavelength-division multiplexing network, irrespective of the network topology, for example point-to-point, ring, or meshed networks, with any combination of network nodes which use amplifiers with gain and output power control including terminal sites, fixed optical add-drop, reconfigurable optical add-drop multiplexer, or amplifier nodes.

BRIEF DESCRIPTION OF THE DRAWINGS

Embodiments of the invention will now be described with reference to the drawings.

DESCRIPTION OF THE INVENTION

Figure 1:
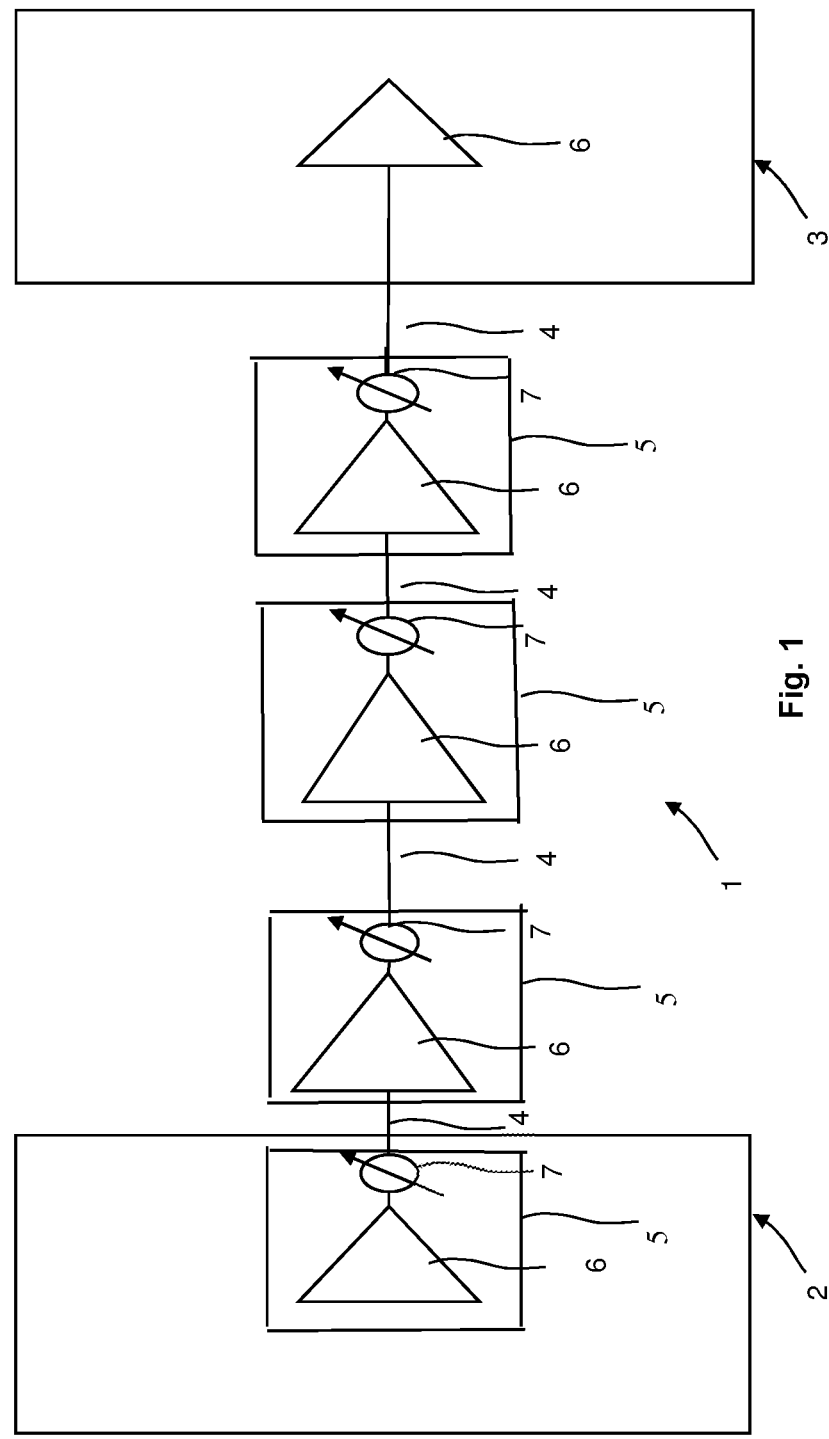
FIG. 1 illustrates an example section of an optical fiber network.

FIG. 1 illustrates an example section 1 of an optical fiber network. The network is a wavelength-division multiplexing (WDM) Network.

As shown in FIG. 1, an ingress WDM node 2 is connected to an egress WDM node 3 via spans 4 of optical fiber. The spans 4 of optical fiber are coupled via optical amplifiers 5. An amplifier 5 in the ingress node 2 is optically coupled to the first span 4 of optical fiber. An amplifier 5 in the egress node 3 is optically coupled to the final span 4 of optical fiber.

The optical amplifiers 5 shown in FIG. 1 are optical amplifiers with independent gain and output power controls and amplifier noise figure dependence on amplifier gain. In this regard, FIG. 1 also shows variable-gain amplifier 6 and corresponding variable optical attenuators (VOA) 7, wherein the output power is respectively controlled using the respective variable optical attenuator 7. Here, the actual amplifier 6 and the variable optical attenuator 7 are respectively shown being separated from each other. However, each optical amplifier with independent gain and output power control may also be an amplifier in which a variable attenuator is integrated. The optical amplifiers 5 can for example be erbium-doped fiber amplifiers (EDFAs) which ensure that the amplifier operates with the lowest possible noise figure regardless of the launch power. However, the optical amplifiers 5 can for example also be hybrid Raman-EDFAs, in particular amplifiers comprised of a combination of a Raman amplifier connected to the input of an EDFA, wherein the Raman amplifier can be discrete or distributed. Therein, one or both amplifier stages could also be semiconductor amplifiers.

One can index the spans 4 and the optical amplifier devices by an index i, with N representing the total number of spans of optical fiber coupling the ingress node 2 to the egress node 3.

Network operators have a strong interest in making most efficient use of their investments in the network infrastructure, and therefore, a strong interest in achieving the highest transmission capacity through the fiber optical transmission lines in the network. Therein, for most fiber optical transmission lines impairments determining the total capacity of the fiber within a given bandwidth are amplified spontaneous emission (ASE) noise from optical amplifiers 5 along the line and fiber nonlinear effects. It is also known that the power of the optical signal launched into each span 4 is a critical parameter of the system, which determines the capacity that can be attained. Low power launched into the fiber yields low optical signal-to-noise ratio (OSNR), which reduces the available transmission rate. High power launched into the fiber produces nonlinear distortions. Thus, low launch power increases the amplified spontaneous emission noise, while high launch power increases nonlinear noise, and an optimum launch power into each span 4 exists where the performance of a signal is maximized.

Therefore, the optimization of the launch power is important to optimize the performance of the network. However, known methods to determine the optimum launch power are based on a simplified optimization approach, wherein the noise figure of the optical amplifiers is assumed to be constant regardless of the amplifier gain value used to compensate the span loss, regardless of the tilt setting the amplifier, and assumed to be constant for all channels. However, this over-simplification leads to an error in the estimation of the optimum launch power, in particular as there are optical amplifiers known with independent gain and output power controls. Therefore, there is a need for a method for optimizing performance of a multi-span optical fiber network, wherein the determination of the optimum launch power is as precise as possible.

Figure 2:
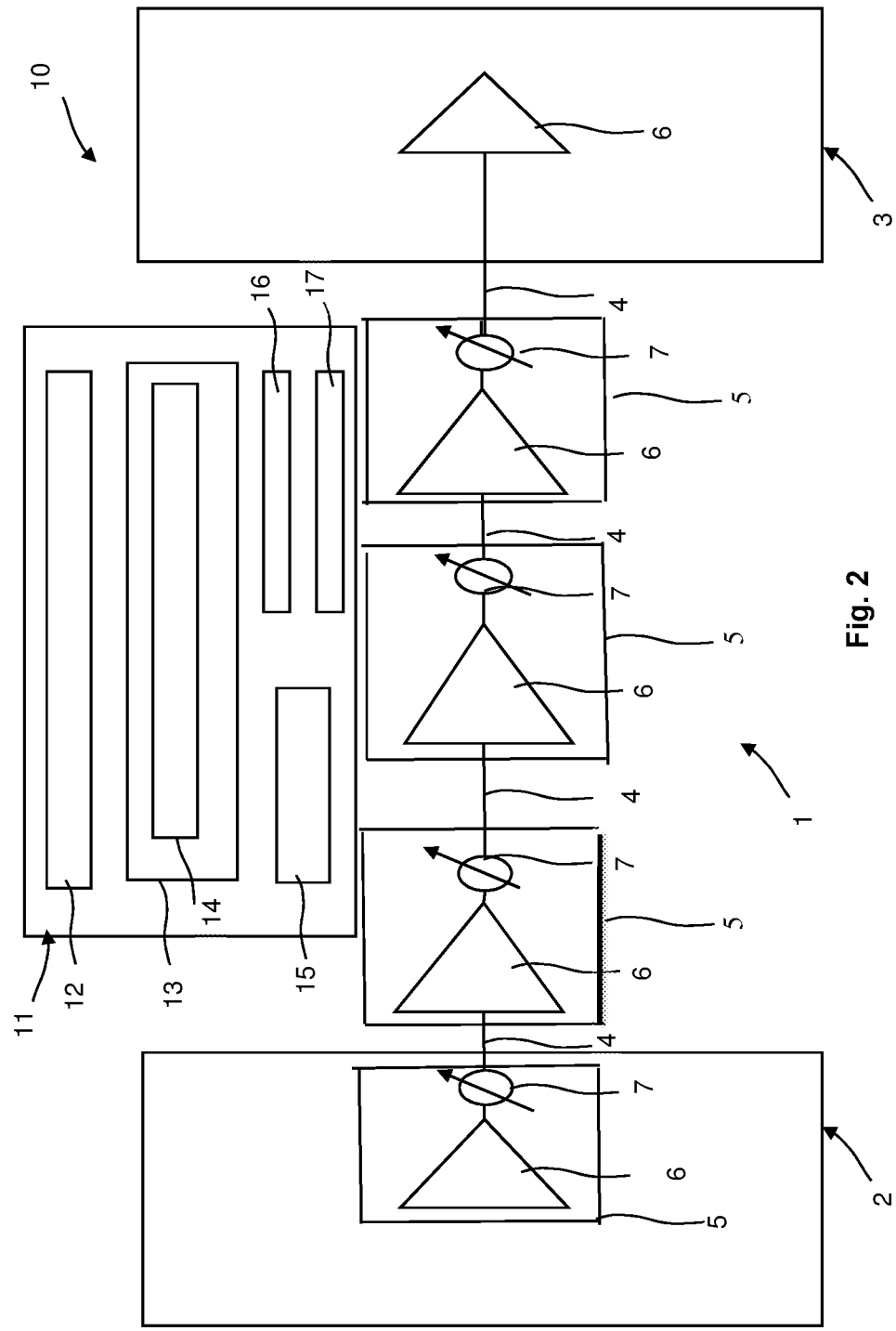
FIG. 2 illustrates a system that includes a network control device for optimizing performance of a multi-span optical fiber network according to embodiments of the invention.

FIG. 2 illustrates a system 10 that includes a network control device 11 for optimizing performance of a multi-span optical fiber network according to embodiments of the invention.

As shown in FIG. 2, the multi-span optical fiber network comprises a section 1 of an optical fiber network as shown in FIG. 1, wherein the same elements as in FIG. 1 are given the same reference numbers as in FIG. 1 and are not discussed in any further detail here.

The system 10 further comprises a network control device 11, wherein the network control device 11 comprises a computing means 12 which is configured to, for each span, compute an amplifier noise figure and a non-linear noise generated in the span based on information about the span and to use the computed amplifier noise figure and the computed non-linear noise to compute an optimum launch power, and an optimizing means 13 which is configured to optimize performance of the multi-span optical fiber network based on the computed optimum launch powers of all spans.

Therein, that the parameters and, in particular, that the amplifier noise figure and a non-linear noise generated in each span are computed means that these parameters, respectively information characterizing the parameters are derived respectively calculated by methods of functional analysis and numerical mathematics.

Thus, a network control device 11 for optimizing a multi-span optical fiber network is provided which is as precise as possible, as all relevant parameters that can impact the value of the optimum launch power are taken into account. In particular, the amplifier noise figure is not assumed to be constant but for each span information characterizing the amplifier noise figure is defined. Therein, the information about the span preferably includes all relevant parameters of the fiber and information about components which can impact the value of the optimum launch power. Further, as the optimum launch power is separately computed for each span, a global transmission fiber line optimization problem can be reduced to a local per span optimization problem, which makes the optimization numerically very fast, while supporting multi-span transmission fiber lines with different types of fiber in different spans. Therefore, the network control device also addresses the problem that communication systems often evolve and grow during their lifetime, wherein, due to their evolution and growth, these infrastructures often combine different technologies which can produce optical fiber transmission lines that are span-wise heterogeneous.

According to the embodiments of FIG. 2, the information about the span includes a span length, information about the associated transmission fiber, information about an optical amplifier associated with a previous span, a symbol rate of a corresponding transceiver and a frequency spacing between channels transmitted on the previous span.

The optimizing means 13 further comprises a controlling means 14 which is configured to separately optimize the performance of each span by setting the gain of an amplifier associated with a particular span and the output power of an amplifier associated with a span that is immediately preceding the particular span based on the computed optimum launch power of the particular span. In particular, by setting the output power of an amplifier associated with a span immediately preceding the particular span based on the computed optimum launch power of the particular span, it can be ensured that this optimum launch power is in fact launched into the particular span. Further, power losses in the particular span at the optimum launch power can be compensated by setting the gain of the amplifier based on the computed optimum launch power.

Further, the computing means 12 is configured to use linear equivalents of the information about the span to compute the amplifier noise figure.

The network control device 11 is further configured to optimize the performance of the multi-span optical fiber network during a planning phase of a network deployment. Therein, the planning phase is a phase during the network planning and design, in which it is, among others, determined whether a predefined system infrastructure, sites, and an operational environment can support a proposed system. As shown in FIG. 2, the network control device further comprises a memory 15 in which usual values for the information about the span are stored. That usual values are chosen for the information about the span means that the values are chosen in such a way that they are common for a comparable usual span, respectively that either design or manufacturing data is chosen for the values. For example, a dependence between noise figure and gain can be chosen that represents a usual amplifier of the same type. Further, the values may be provided by a carrier to a system vendor during design stage.

In the multi-span optical fiber network pairs of nodes of the network are associated with distinct bands of optical channels used for communication between the pairs of nodes. Therein, the network control device 11 according to the embodiments of FIG. 2 is, in particular, configured to, during a planning phase of a network deployment, calculate a maximum generalized optical signal-to-noise ratio for the central channel based on the computed optimum launch powers of all spans of the central channel and to use the maximum generalized optical signal-to-noise ratio of the central channel to optimize the performance of the multi-span optical fiber network.

According to the embodiments of FIG. 2, the network control device 11 is further configured to optimize the performance of the multi-span optical fiber network as part of a network turn-up and commissioning. Therein, network turn-up and commissioning means the phase after the system equipment has been deployed, during which a series of steps are taken to prove that the system actually meets the specific requirements. As shown in FIG. 2, the network control device 11 further comprises a first determining means 16 which is configured to determine exact values for the information about the span.

Therein, the network control device 11 is configured to, during network turn-up and commissioning, separately calculate a maximum generalized signal-to-noise ratio for each channel based on the computed optimum launch powers of all spans of the respective channel.

As shown in FIG. 2, the network control device further comprises a second determining means 17 to determine a worst generalized optical signal-to-noise ratio from the calculated maximum generalized optical signal-to-noise ratios of the channels, wherein the optimizing means 14 is configured to use the worst generalized optical signal-to-noise ratio to optimize the performance of the multi-span optical fiber network.

Figure 3:
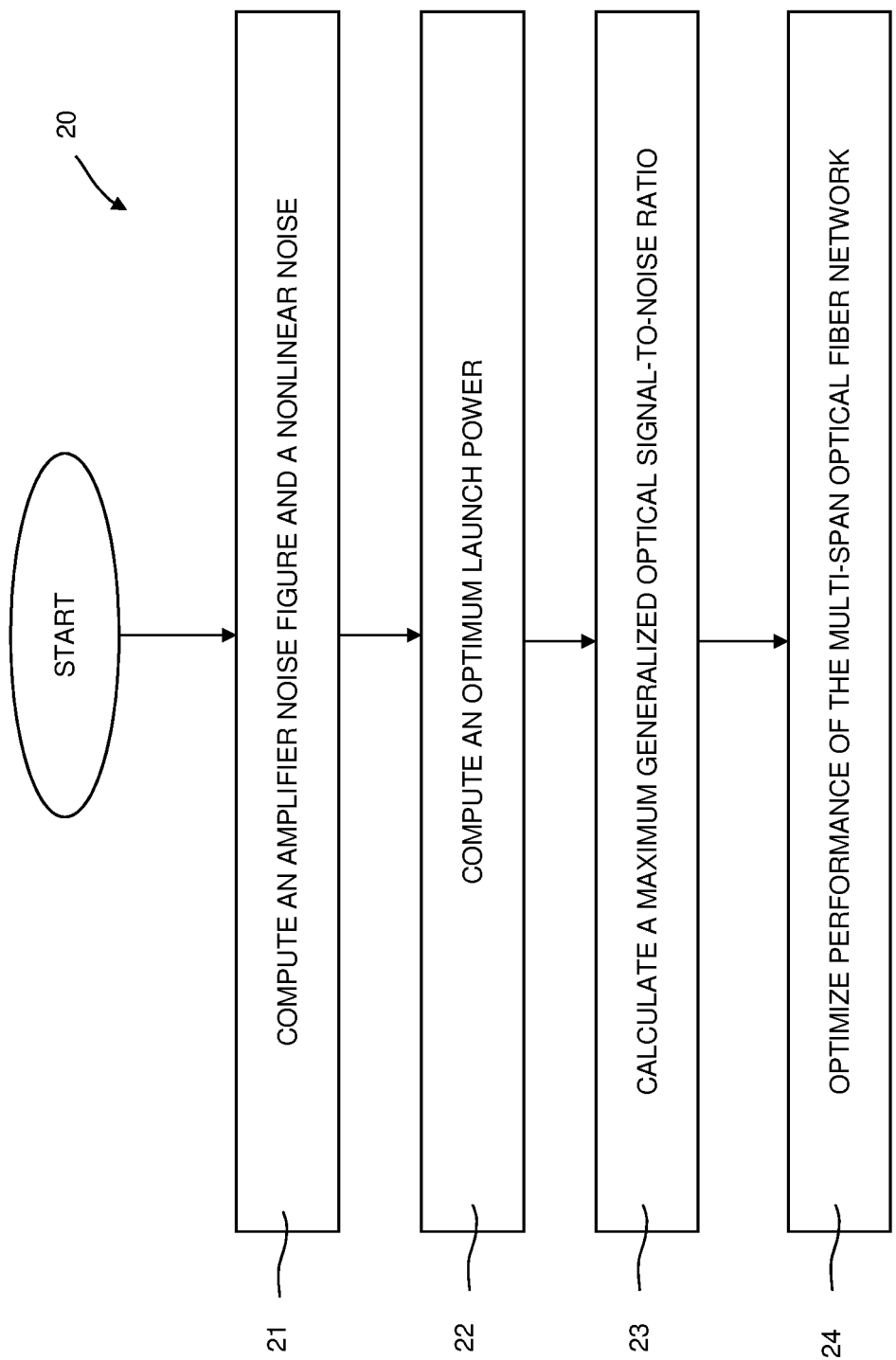
FIG. 3 illustrates a flowchart of a method for optimizing performance of a multi-span optical fiber network according to a first embodiment of the invention.

FIG. 3 illustrates a flowchart of a method 20 for optimizing performance of a multi-span optical fiber network according to a first embodiment of the invention.

In particular, FIG. 3 shows a method 20 for optimizing performance of a multi-span optical fiber network, wherein each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line. The method 20 comprises the steps of, for each span, computing the amplifier noise figure and computing non-linear noise generated in the span based on information about the span 21 and using the computed amplifier noise figure and the computed non-linear noise to compute an optimum launch power 22, and, optimizing performance of the multi-span optical fiber network based on the computed optimum launch powers of all spans.

Therein, that gain and output power of the associated optical amplifier are respectively controlled independently, wherein an amplifier noise figure respectively depends on the gain of the associated optical amplifier, means that the associated optical amplifier is an optical associated amplifier with independent gain and output power controls and amplifier noise figure dependence on amplifier gain. Therein, for example the control of the output power can be integrated in the optical amplifier but can also be established independently of the optical amplifier. Further, that the parameters and, in particular, that the amplifier noise figure and a non-linear noise generated in each span are computed means that these parameters, respectively information characterizing the parameters are derived respectively calculated by methods of functional analysis and numerical mathematics.

According to the embodiment of FIG. 3, the information about the span includes a span length, information about the associated transmission fiber, information about an optical amplifier associated with a previous span, a symbol rate of a corresponding transceiver and a frequency spacing between channels transmitted on the previous span.

In particular, according to the embodiment of FIG. 3, the information about the span includes the following variables:
amplifier gain respectively the amplifier gain dependence on signal power $G_i$ (dB), amplifier noise figure $NF_i$ (dB), fiber span loss in the ith-span $Loss_i$ (dB), channel power into the span optical power $P_i$ (dBm), the max output power level respectively the signal max power per channel $P_{max\_per\_ch,i}$ and ASE noise power $P_{ase,i}$ (dBm) (scaled to 0.1 nm/12.5 GHz bandwidth).

Therein, the spans and the optical amplifier devices are indexed by the index i, with N representing the total number of spans of optical fiber.

The ASE noise power can be determined based on the standard equation $$P_{ase,i}\text{ (dBm)}=G_i\text{ (dB)}+NF_i\text{ (dB)}-57.9 \qquad (1).$$

Further, the max output power level depends on the amplifier type.

According to the embodiment of FIG. 3, further linear equivalents of the information about the span are used to compute the amplifier noise figure. In particular, in addition to the above-stated variables in decibel units, their linear counterparts can be defined as $$G_i=\text{span amp gain (normalized linear units)}= 10^{0.1*G_i(dB)} \qquad (2)$$

$$Loss_i=\text{span loss (normalized linear units)}= 10^{-0.1*Loss_i(dB)} \qquad (3)$$

$$NF_i=\text{span amp noise figure (normalized linear units)}=10^{0.1*NF_i(dB)} \qquad (4)$$

$$P_i=\text{signal power (linear units } W)=10^{0.1*P_i(dBm)}/1000 \qquad (5)$$

$$P_{max\_per\_ch,i}=\text{signal power (linear units } W)=10^{0.1*P_{max\_per\_ch,i}(dBm)}/1000 \qquad (6)$$

$$P_{ase,i}=\text{ASE noise power(linear units } W)= 10^{0.1*P_{ase,i}(dBm)}/1000=G_i NF_i 10^{-8.79} \qquad (7)$$

The amplifier gain dependence on signal power can be given in both dB- and linear units:

$$G_i(dB) = P_{max\_per\_ch,i}(dBm) - P_{i_{out}}(dBm) = \qquad (8a)$$
$$P_{max\_per\_ch,i}(dBm) - (P_i(dBm) - Loss_i(dB))$$

$$G_i = \frac{P_{max\_per\_ch,i}}{P_i Loss_i} \qquad (8b)$$

In formulas (1) and (7), the factor ($G_i$−1) was replaced by $G_i$ for simplicity. Further, the factor $10^{-8.79}$ was derived from the standard expression composed of physical constants $$-8.79 = \text{LOG } 10(h*\nu*12.5E9 \text{ Hz}), \quad (5)$$

wherein ν=193.8 THz (1546.9 nm) is the central wavelength in C-band, h is planck's constant, and wherein E9 stands for $10^9$.

Further, the noise figure for usual amplifiers depends on the gain, wherein a 3rd order polynomial gain expression can be used for the dependency, wherein the polynomial coefficients are fitted for each amplifier type separately. In particular, the polynomial coefficients are obtained in several steps of amplifier measurement characterization, wherein first the noise figure is characterized at fixed amplifier gain and tilt over an amplifier bandwidth over multiple modules. Then, for each module, the worst respectively maximum value of the noise figure is identified at some wavelength and the worst values are averaged over all characterized modules and result in a single worst value at fixed gain and tilt. Thereafter, the process is repeated at various gain values wherein characterization data of a resulting plot of noise figure versus gain is fitted with a cubic polynomial with specific coefficients, which depend on the amplifier type. In particular, the noise figure can be defined as follows:

$$NF \text{ (dB)} = A_0 + A_1 G \text{ (dB)} + A_2 G \text{ (dB)}^2 + A_3 G \text{ (dB)}^3 \quad (9a)$$

$$NF(G) = 10^{0.1*(A_0 + A_1 10*LOG\ 10(G) + A_2(10*LOG\ 10(G))^2 + A_3 (10*LOG\ 10(G))^3)} \quad (9b)$$

Therein, the optimum launch power is then obtained by taking the first derivative of the inverse generalized optical signal-to-noise ratio with respect to the signal power $P_i$ and equating the result to zero, wherein the spans and the optical amplifier devices are indexed by the index i, with N representing the total number of spans of optical fiber.

$$\frac{1}{GOSNR_i} = \frac{1}{OSNR_i} + VAR_{NLI_i} = \frac{P_{ase,i}}{P_{max\_per\_ch,i}} + \eta_i P_i^2 \quad (10)$$

In formula (11), $GOSNR_i$, $OSNR_i$, and the normalized nonlinear variance $VAR_{NLI}$ were respectively defined after the i-th optical amplifier and before the built-in optical attenuator.

Further, the expression $VAR_{NL} = \eta_i P_i^2$ for the normalized variance can be obtained by defining the nonlinear noise power at the ith-span before the optical amplifier with nonlinear efficiency $\eta_i$ being defined by the standard equation $$P_{NLI_i} = \eta_i P_i^3 Loss_i, \quad (11)$$

with $$\eta_i = B_n \left(\frac{2.0}{3.0}\right)^3 \frac{\gamma^2(1/R_s^3)L_{eff}^2}{\pi|\beta_2|L_{eff,a}} \text{asinh}\left(\frac{\pi^2}{2}|\beta_2|L_{eff,a}R_s^2 N_{ch}^{2\frac{R_s}{\Delta f}}\right), \quad (12)$$

wherein the nonlinear efficiency is scaled to the bandwidth $B_n$=12.5 GHz, $R_s$ is the modulated signal symbol rate, $N_c$h is the number of channels, Δf is the channel slot, $L_{eff}$ is the effective loss length, $L_{eff,a}$ is the asymptotic effective loss length, $\beta_2$ is the fiber group-velocity dispersion parameter, and wherein γ is the fiber nonlinear coefficient.

The result of formula (11) is then multiplied by gain $G_i$ and divided by the signal max power per channel $P_{max\_per\_ch,i}$.

$$VAR_{NLI_i} = \eta_i P_i^3 Loss_i \frac{G_i}{P_{max\_per\_ch,i}} = \eta_i P_i^2,$$

wherein, as defined in formula (8b), $$G_i = \frac{P_{max\_per\_ch,i}}{P_i Loss_i}.$$

Similarly, the expression in $$\frac{P_{ase,i}}{P_{max\_per\_ch,i}}$$

formula (9) can be transformed by $$\frac{P_{ase,i}}{P_{max\_per\_ch,i}} = \frac{P_{ase,i}/G_i}{P_{max\_per\_ch,i}/G_i} = \frac{P_{ase,i}/G_i}{P_{i\_out}} = \frac{P_{ase,i}}{P_i Loss_i G_i}.$$

Based on these simplifications, formula (9) can be transformed in $$\frac{1}{GOSNR_i} = \frac{P_{ase,i}}{P_i Loss_i G_i} + \eta_i P_i^2 = \frac{NF_i 10^{-8.79}}{P_i Loss_i} + \eta_i P_i^2. \quad (13)$$

Taking the first derivative of formula (13) with respect to the signal power $P_i$ and equating the result to zero then results in $$\frac{d}{dP}\left(\frac{1}{GOSNR}\right) = \frac{\frac{dNF}{dP}10^{-8.79}}{P\text{Loss}} - \frac{NF10^{-8.79}}{P^2\text{Loss}} + 2\eta P = 0, \quad (14a)$$

wherein formula (14a) can be simplified to $$2\eta P^3 \text{Loss} - NF10^{-8.79} = RHS = -10^{-8.79}\frac{dNF}{dP}P. \quad (14b)$$

In equations (14a) and (14b), the span index i has been omitted for notification simplicity.

Further, NF is a nested function of the signal power. Therein, its derivative with respect to the signal power is a complex function, wherein $$\frac{dNF}{dP} = \frac{dNF}{dG}\frac{dG}{dP}, \quad (15)$$

with $$\frac{dG_i}{dP_i} = -\frac{G_i}{P_i} = \frac{P_{max\_per\_ch,i}}{P_i^2 Loss_i} \quad (16)$$

and $$\frac{dNF}{dG} = \frac{NF(G)}{G}\frac{dNF(\text{dB})}{dG(\text{dB})} = \quad (17)$$

-continued $$\frac{NF(G)}{G}(A_1 + 2A_2 10\text{LOG}10(G) + 3A_3(10\text{LOG}10(G))^2).$$

Combining formulas (15), (16) and (17) results in $$\frac{dNF}{dP} = -\frac{NF(G)}{P}\frac{dNF(\text{dB})}{dG(\text{dB})} = \qquad (18)$$

$$-\frac{NF(G)}{P}(A_1 + 2A_2 10\text{LOG}10(G) + 3A_3(10\text{LOG}10(G))^2).$$

Combining formulas (14b) and (18) then results in the transcendental equation $$\frac{2\eta P^3 \text{Loss}}{10^{-8.79} NF(G)} = (1 + A_1 + 2A_2 G(\text{dB}) + 3A_3 G(\text{dB})^2). \qquad (19)$$

In formula (19), the span index i has been omitted for notification simplicity.

By numerically solving the system of the two coupled equations (8b) and (19), optimal values for both the signal power $P_i$ and the related amplifier gain $G_i$ can be determined. Therein, full spectral loading is assumed. This assumption could, however, be removed as optimization could also be done for a subset of channels. Further, uniform signal power is assumed across the amplifier bandwidth.

Further, the impact of the amplifier output tilt on the noise figure and its impact on channel optimization could be taken into account by replacing the variable gain G (dB) in formula (9a) with gain_caldB $G_{cal,i}$, which depends on both the gain in decibel units and the tilt via the tilt dependence function TiltdB, which depends, among others, on the channel input signal power averaged over the channel plan.

According to the embodiment of FIG. 3, after, for each span, the optimum launch power has been computed, the computed optimum launch power is used to calculate a maximum generalized optical signal-to-noise ratio of the span in step 23.

To calculate the maximum generalized optical signal-to-noise ratio, the optimal values $P_{opt}$ and $G_{opt}$, which have been derived by numerically solving formulas (8b) and (19), and the corresponding value of the noise figure $NF_i$ can be used to compute the following formulas:

Span $OSNR_i$ (20)

$$OSNR_i = \frac{P_{max\_per\_ch,i}}{P_{ase,i}} = \frac{P_{max\_per\_ch,i}}{G_i NF_i 10^{-8.79}} = \frac{P_i Loss_i}{NF_i 10^{-8.79}}$$

Span MAX $GOSNR_i$ (21)

$$\frac{1}{MAXGOSNR_i} = \frac{1}{OSNR_i} + \eta_i P_i^2 = \frac{1}{OSNR_i}\left(\frac{3}{2} - P_i \frac{dNF_i}{dP_i} \Big/ NF_i\right)$$

Further, Link MAX $GOSNR_{link}$ can be calculated by summation over all spans $$\frac{1}{MAXGOSNR_{link}} = \qquad (22)$$

$$\sum_{i=1}^{N_s} \frac{1}{MAXGOSNR_i} = \sum_{i=1}^{N_s} \frac{1}{OSNR_i}\left(\frac{3}{2} - P_i \frac{dNF_i}{dP_i} \Big/ NF_i\right)$$

As common optical communication systems also have two booster amplifiers that are responsible for loss compensation in terminal equipment and loss compensation in reconfigurable optical add-drop multiplexers, the values of the link optical signal-to-noise ratio and generalized optical signal-to-noise ratio can be affected, wherein this impact can be accounted for when computing the maximum generalized optical signal-to-noise ratio of the corresponding transmission line by adding a sum over all booster amplifiers $$\frac{1}{MAXGOSNR_{link}} = > \frac{1}{MAXGOSNR_{link}} + \sum_{k=1}^{N_{boosters}} \frac{1}{OSNR_k},$$

wherein $N_{boosters}$ is the number of boosters in the optical communication system.

The maximum generalized optical signal-to-noise ratios of all spans, respectively the maximum generalized optical signal-to-noise ratio of the corresponding transmission line, respectively the maximum of the signal performance metric can then be used in step 24 to optimize the performance of the multi-span optical fiber network. Therein, the maximum generalized optical signal-to-noise ratio results in the optimization of signal primary measurable characteristics, as the maximization of the signal-to-noise ratio and the parameter Q, as well as the minimization of the bit-error rate BER.

REFERENCE SIGNS

1 section
2 ingress node
3 egress node
4 span
5 amplifier with independent gain and output power control
6 amplifier with variable gain
7 variable optical attenuator
10 system
11 network control device
12 computing means
13 optimizing means
14 controlling means
15 memory
16 first determining means
17 second determining means
20 method
21 method step
22 method step
23 method step
24 method step

The invention claimed is:

1. A method for optimizing performance of a multi-span optical fiber network, wherein each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line, and wherein the method comprises the steps of:

for each span, computing the amplifier noise figure and a non-linear noise generated in the span based on information about the span and using the computed amplifier noise figure and the computed non-linear noise to compute an optimum launch power; and optimizing performance of the multi-span optical fiber network based on the computed optimum launch powers of all spans, wherein:

the step of optimizing performance of the multi-span optical fiber network based on the computed optimum launch powers of all spans further comprises the step of:

separately optimizing performance of each span by setting the gain of an amplifier associated with a particular span and the output power of an amplifier associated with a span that is immediately preceding the particular span based on the computed optimum launch power of the particular span, and by setting the gain of the amplifier associated with the particular span based on an optimum gain that is derived from the computed optimum launch power of the particular span.

2. The method according to claim 1, wherein the information about the span includes a span length, information about the associated transmission fiber, information about an optical amplifier associated with a previous span, a symbol rate of a corresponding transceiver and a frequency spacing between channels transmitted on the previous span.

3. The method according to claim 1, wherein the step of optimizing performance of the multi-span optical fiber network based on the computed optimum launch powers of all spans further comprises the steps of:

for each span, using the computed optimum launch power to calculate a maximum generalized optical signal-to-noise ratio of the span; and using the calculated maximum generalized optical signal-to-noise ratios of all spans to optimize the performance of the multi-span optical fiber network.

4. The method according to claim 1, wherein linear equivalents of the information about the span are used to compute the amplifier noise figure.

5. The method according to claim 1, wherein the performance of the multi-span optical fiber network is optimized during a planning phase of a network deployment, wherein usual values are chosen for the information about the span, and optionally, wherein in the multi-span optical fiber network pairs of nodes of the network are associated with distinct bands of optical channels used for communication between the pairs of nodes, wherein a maximum generalized optical signal-to-noise ratio is calculated for the central channel based on the computed optimum launch powers of all spans of the central channel, and wherein the maximum generalized optical signal-to-noise ratio of the central channel is used to optimize the performance of the multi-span optical fiber network.

6. The method according to claim 1, wherein the performance of the multi-span optical fiber network is optimized as part of a network turn-up and commissioning, wherein exact values are chosen for the information about the span, and optionally, wherein in the multi-span optical fiber network pairs of nodes of the network are associated with distinct bands of optical channels used for communication between the pairs of nodes, wherein a maximum generalized optical signal-to-noise ratio is separately calculated for each channel based on the computed optimum launch powers of all spans of the respective channel, wherein a worst generalized optical signal-to-noise ratio is determined from the calculated maximum generalized optical signal-to-noise ratios of the channels, and wherein the worst generalized optical signal-to-noise ratio is used to optimize the performance of the multi-span optical fiber network.

7. A network control device for optimizing performance of a multi-span optical fiber network in which each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line, and wherein the network control device comprises a computing means which is configured to, for each span, compute the amplifier noise figure and a non-linear noise generated in the span based on information about the span and use the computed amplifier noise figure and the computed non-linear noise to compute an optimum launch power, and an optimizing means which is configured to optimize performance of the multi-span optical fiber network based on the computed optimum launch powers of all spans, wherein the optimizing means comprises a controlling means which is configured to separately optimize performance of each span by setting the gain of an amplifier associated with a particular span and the output power of an amplifier associated with a span that is immediately preceding the particular span based on the computed optimum launch power of the particular span, and by setting the gain of the amplifier associated with the particular span based on an optimum gain that is derived from the computed optimum launch power of the particular span.

8. The network control device according to claim 7, wherein the information about the span includes a span length, information about the associated transmission fiber, information about an optical amplifier associated with a previous span, a symbol rate of a corresponding transceiver and a frequency spacing between channels transmitted on the previous span.

9. The network control device according to claim 7, wherein the optimizing means further comprises a calculating means which is configured to, for each span, use the computed optimum launch power to calculate a maximum generalized optical signal-to-noise ratio of the span, and wherein the optimizing means is configured to use the calculated maximum generalized optical signal-to-noise ratios of all spans to optimize the performance of the multi-span optical fiber network.

10. The network control device according to claim 7, wherein the computing means is configured to use linear equivalents of the information about the span to compute the amplifier noise figure.

11. The network control device according to claim 7, wherein the network control device is configured to optimize the performance of the multi-span optical fiber network during a planning phase of a network deployment, wherein the network control device further comprises a memory in which usual values for the information about the span are stored, and optionally, wherein in the multi-span optical fiber network pairs of nodes of the network are associated with distinct bands of optical channels used for communication between the pairs of nodes, wherein the network control device is configured to calculate a maximum generalized optical signal-to-noise ratio for the central channel based on the computed optimum launch powers of all spans of the central channel and to use the maximum generalized optical signal-to-noise ratio of the central channel to optimize the performance of the multi-span optical fiber network.

12. The network control device according to claim 7, wherein the network control device is configured to optimize the performance of the multi-span optical fiber network as part of a network turn-up and commissioning, wherein the network control device further comprises a first determining means which is configured to determine exact values for the information about the span, and optionally, wherein in the multi-span optical fiber network pairs of nodes of the network are associated with distinct bands of optical channels used for communication between the pairs of nodes, wherein the network control device is configured to separately calculate a maximum generalized signal-to-noise ratio for each channel based on the computed optimum launch powers of all spans of the respective channel, wherein the network control device further comprises a second determining means to determine a worst generalized optical signal-to-noise ratio from the calculated maximum generalized optical signal-to-noise ratios of the channels, and wherein the optimizing means is configured to use the worst generalized optical signal-to-noise ratio to optimize the performance of the multi-span optical fiber network.

13. A program product comprising a computer-readable storage medium that stores non-transitory code executable by a processor, the executable code comprising code which, when executed by the processor, causes the processor to:
 (a) for each span in a multi-span optical fiber network, wherein each span has an associated optical transmission fiber connected to an associated optical amplifier, wherein gain and output power of the associated optical amplifier are respectively controlled independently, and wherein an amplifier noise figure respectively depends on the gain of the associated optical amplifier, wherein each associated optical amplifier is further connected to launch optical signals into a remainder of a corresponding optical transmission line, to compute the amplifier noise figure and a non-linear noise generated in the span based on information about the span and to use the computed amplifier noise figure and the computed non-linear noise to compute an optimum launch power; and
 (b) to optimize performance of the multi-span optical fiber network based on the computed optimum launch powers of all spans, wherein step (b) comprises separately optimizing performance of each span by setting the gain of an amplifier associated with a particular span and the output power of an amplifier associated with a span that is immediately preceding the particular span based on the computed optimum launch power of the particular span, and by setting the gain of the amplifier associated with the particular span based on an optimum gain that is derived from the computed optimum launch power of the particular span.

14. The method according to claim 2, wherein the step of optimizing performance of the multi-span optical fiber network based on the computed optimum launch powers of all spans further comprises the steps of:
 for each span, using the computed optimum launch power to calculate a maximum generalized optical signal-to-noise ratio of the span; and
 using the calculated maximum generalized optical signal-to-noise ratios of all spans to optimize the performance of the multi-span optical fiber network.

15. The method according to claim 1, wherein the step of optimizing performance of the multi-span optical fiber network based on the computed optimum launch powers of all spans further comprises the steps of:
 for each span, using the computed optimum launch power to calculate a maximum generalized optical signal-to-noise ratio of the span; and
 using the calculated maximum generalized optical signal-to-noise ratios of all spans to optimize the performance of the multi-span optical fiber network.

16. The network control device according to claim 8, wherein the optimizing means comprises a controlling means which is configured to separately optimize performance of each span by setting the gain of an amplifier associated with a particular span and the output power of an amplifier associated with a span that is immediately preceding the particular span based on the computed optimum launch power of the particular span.

17. The network control device according to claim 8, wherein the optimizing means further comprises a calculating means which is configured to, for each span, use the computed optimum launch power to calculate a maximum generalized optical signal-to-noise ratio of the span, and wherein the optimizing means is configured to use the calculated maximum generalized optical signal-to-noise ratios of all spans to optimize the performance of the multi-span optical fiber network.

* * * * *